(12) United States Patent
Guy et al.

(10) Patent No.: US 10,027,435 B2
(45) Date of Patent: Jul. 17, 2018

(54) CHANNEL WAVELENGTH ASSIGNMENT WITH TRANSIENT REDUCTION

(71) Applicant: Alcatel-Lucent USA Inc., Murray Hill, NJ (US)

(72) Inventors: John Peter Guy, Nepean (CA); Peter David Roorda, North Ottawa (CA); Alan Glen Solheim, Stittsville (CA); Kevan Peter Jones, Kanata (CA); Greg Peter Friesen, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 329 days.

(21) Appl. No.: 14/531,635

(22) Filed: Nov. 3, 2014

(65) Prior Publication Data

US 2015/0055953 A1  Feb. 26, 2015

Related U.S. Application Data

(63) Continuation of application No. 12/576,807, filed on Oct. 9, 2009, now Pat. No. 8,995,833, which is a continuation of application No. 10/391,863, filed on Mar. 19, 2003, now Pat. No. 7,630,635, which is a continuation-in-part of application No. 09/909,265, filed on Jul. 19, 2001, now Pat. No. 7,171,124.

(51) Int. Cl.
*H04J 14/02* (2006.01)
*H04Q 11/00* (2006.01)

(52) U.S. Cl.
CPC ........ *H04J 14/0246* (2013.01); *H04J 14/025* (2013.01); *H04J 14/0227* (2013.01);
(Continued)

(58) Field of Classification Search
CPC .................................................. H04J 14/0227
See application file for complete search history.

(56) References Cited

U.S. PATENT DOCUMENTS 7,058,296 B2 * 6/2006 Saniee ................ H04J 14/0284
398/3

FOREIGN PATENT DOCUMENTS

WO     WO01/018999 A1 *  3/2001  ............. H04B 10/08

OTHER PUBLICATIONS

R. He et al., "Priority-based Wavelength Assignment Algorithm in WDM Networks", Optical Networking, Proceedings of SPIE, Nov. 13, 2001.*

(Continued)

*Primary Examiner* — Shi K Li
(74) *Attorney, Agent, or Firm* — The Capitol Patent & Trademark Law Firm, PLLC

(57) ABSTRACT

In an automatically switched optical network operating according to a wavelength plan, the wavelengths are assigned to an optical path based on availability, performance and SRS wavelength coupling reduction. First, the wavelengths are grouped in static bins based on their reach versus cost performance, and each bin assumes a $\Delta Q$ of a middle wavelength. Then, the bins are moved into subsets of dynamic bins, constructed using bin constraints that account for the particulars of the respective optical path. The path is characterized taking into account the wavelength currently accessing at the end nodes, and the wavelength tandeming through the end nodes. Wavelength selection starts with the bins that satisfy the maximum number of constraints, and the wavelengths are checked sequentially against wavelength constraints; relaxed constraints are also applied when it is not possible to exactly satisfy one or more constraints.

5 Claims, 6 Drawing Sheets

(52) U.S. Cl.
CPC ...... *H04J 14/0257* (2013.01); *H04J 14/0269* (2013.01); *H04Q 11/0005* (2013.01); *H04Q 11/0062* (2013.01); *H04J 14/0221* (2013.01); *H04J 14/0271* (2013.01); *H04J 14/0284* (2013.01); *H04Q 2011/0075* (2013.01)

(56) References Cited

OTHER PUBLICATIONS

N. Golmie et al., "A Differentiated Optical Services Model for WDM Networks", IEE Communications Magazine, Feb. 2000.*

K. Lee et al., "Multi-Wavelength All-Optical Networks with Wavelengths Outside the Erbium-Doped Fiber Amplifier Bandwidth", Journal of Lightwave Technology, vol. 13, No. 5, May 1995.*

R. He et al., "A Priority-based Wavelength Assignment Algorithm in WDM Optical Transport Networks", Journal of China Institute of Communications, vol. 22, No. 3, Mar. 2001.*

G. Lehr et al., "Management of All-Optical WDM Networks: First Results of European Research Project MOON", NOMS '98, IEEE Network Operations and Management Symposium, vol. 3, Conf. 10, Feb. 15, 1998, pp. 870-879, XP000793435.*

Wolfgang Mader et al., "Results of the PHOTON and MOON Field Trials", OFC/IOOC '99, Optical Fiber Communication Conference/ International Conference on Integrated Optics and Optical Fiber Communication, Feb. 21, 1999, pp. 234-236, XP000967039.*

Nasir Ghani et al., "On IP-over-WDM Integration", IEEE Communications Magazine, vol. 38, No. 3, Mar. 2000, pp. 72-84, XP011091247.*

\* cited by examiner

CHANNEL WAVELENGTH ASSIGNMENT WITH TRANSIENT REDUCTION

PRIORITY PATENT APPLICATION

This application is a Continuation of U.S. patent application Ser. No. 12/576,807 entitled "Channel Wavelength Assignment with Transient Reduction" (Guy et al.) filed Oct. 9, 2009, which is a Continuation of U.S. patent application Ser. No. 10/391,863 entitled "Channel Wavelength Assignment with Transient Reduction" (Guy et al.) filed Mar. 19, 2003, which is a Continuation-in-Part of U.S. patent application Ser. No. 09/909,265 entitled "Wavelength Routing and Switching Mechanism for a Photonic Transparent Network" (Smith et al.) filed Jul. 19, 2001, wherein the disclosures of U.S. patent application Ser. Nos. 12/576,807, 10/391,863 and 09/909,265 are hereby incorporated by reference in their entireties herein as if they had been set forth in full herein.

RELATED PATENT APPLICATIONS

U.S. patent application Ser. No. 10/017,833 for "Wavelengths Assignment in an Optical WDM Network" (Solheim et al.) filed April Dec. 12, 2001, and assigned to Innovance, Inc.

U.S. patent application Ser. No. 10/128,092 for "Dynamic Assignment of Wavelengths in Agile Photonic Networks" (Kotikalapudi et al.) filed Apr. 23, 2002, and assigned to Innovance, Inc.

These patent applications are incorporated herein by reference.

FIELD OF THE INVENTION

The invention resides in the field of optical telecommunications networks, and is directed in particular to channel wavelength assignment with transient reduction.

BACKGROUND OF THE INVENTION

Advances in transmitter and receiver design, evolution of optical amplification, employment of distributed Raman amplification combined with various dispersion compensation techniques, new encoding and modulation techniques, digital wrapper technology, etc., enabled development of ultra-long reach ULR networks, where an optical signal needs to be regenerated after 3,000 km or more. Since the modern ULR techniques allow optical signals to travel without regeneration over distances greater than the distance between two or more successive nodes, OEO conversion at all intermediate nodes is not necessary in the majority of cases.

However, traditional WDM transport systems use point-to-point connectivity, where all channels are optical-to-electrical-to-optical (OEO) converted at each node. This architecture requires compromises on at least two fronts. Thus, channel performance optimization is possible by either using a full spectrum of channels on each link and constraining the reach of all channels to the reach of the worst performing channel in the system (optimize capacity), or by reducing the channel count of the system by a certain percentage, therefore removing the worst channels, and constraining the reach to that of the worst remaining channel (reduce capacity to optimize reach).

As a result, the advantages of the ULR cannot be fully exploited in point-to-point network architectures.

There is a trend towards a new generation of optical networks that takes full advantage of the modern ULR techniques to obtain important cost savings by eliminating the equipment used for the unnecessary OEO conversion. An agile photonic network switches a channel in optical format, while automatically regenerating the respective channel only when necessary. Reduction of the regeneration sites dramatically reduces the node complexity, and consequently the network cost. In addition, the new connection oriented architecture enables service automation, so that the user can automatically establish an end-to-end connection at a push of a button. This again results in important cost and time savings, in that it practically eliminates the manual network engineering required by the current optical networks. Also, this new architecture has, among numerous other advantages, the ability to treat each connection differently, so as to provide the respective user with an individualized class of service, with the corresponding revenue differentiation.

The parent US Patent Application Docket 1021 US describes an automatic wavelength routing and switching mechanism for an agile photonic network. In this type of network, regenerators and wavelengths are two of the most important network resources; methods to economically use these resources are crucial to cost reduction and operational efficiency. These resources are allocated to a connection according to certain rules, which are dictated by the class of service for the respective connection, and by the current network connectivity and loading. New rules may be readily added, or the existing rules may be amended for a certain desired result.

As described in the above-referenced U.S. Patent Application Docket 1011 US, due to the transmission medium (fiber) intrinsic characteristics, the channel reach is a natural function of the channel wavelength. In addition, current technologies being used in WDM systems, such as Raman and/or EDFA optical amplification and slope matched dispersion compensation, further differentiate the performance of a channel according to its wavelength and to the wavelengths of the co-propagating channels. Experiments show that the ratio between the reach of the "best" and "worst" performing wavelengths can be more than 2:1 for the same launch power. Therefore, the wavelength assignment may be optimized if the network management takes into account the individual wavelength performance.

U.S. Patent Application Docket 1046US (Kotikalapudi et al.) describes the basic rules for wavelength assignment, which take into account the wavelength performance and current wavelength assignment. The wavelengths are organized in binning tables, or bins, based on their performance. Once a bin corresponding to the length of the optical path under consideration is identified in the binning table, the wavelength for that path is selected based on path length alone, or based on the length and one or more additional parameters. Such additional parameters are for example the wavelength spacing, the load on the respective optical path, the fiber type, network-wide wavelength utilization (fragmentation), etc. The optical path performance is estimated for the selected wavelength, and the search continues if the estimated path performance is not satisfactory. Several available wavelengths are identified and the wavelength that is most used is selected and assigned to the respective optical path.

It has been noted that the position in the spectrum of a wavelength selected for a new connection is important. More precisely, it is important that the channels traveling along any optical path are spaced apart so as to minimize signal-to-signal coupling due to stimulated Raman scattering (SRS). SRS is a non-linear phenomenon, which results in migration of power from lower wavelength channels to higher wavelength channels. Thus, SRS transfers the power of one or more Raman pumps of a certain wavelength to the channels of the WDM signal passing through the pumped fiber. On the other hand, SRS also redistributes the optical power between the channels of the WDM signal. For example, a large number of channels with shorter wavelengths can significantly amplify the longer wavelength channels. Also, a close spacing between the channels creates an amplification effect that results in the spectrum of the WDM signal being undesirable tilted, the tilt increasing with the signal power.

SUMMARY OF THE INVENTION

It is an object of the invention to optimize wavelength assignment in agile networks.

According to one aspect the invention provides a method of assigning a wavelength to an optical path for connecting two end nodes of an automatically switched optical network operating according to a wavelength plan, comprising: (a) grouping all wavelengths provided by the wavelength plan into static bins according to a wavelength natural performance parameter $\Delta Q$; (b) determining a performance threshold value Th for the optical path for qualifying selection of a wavelength for the optical path; and (c) selecting from the static bins a set S0 of dynamic bins $B_{S0}$ based on the threshold and the $\Delta Q$.

According to another aspect of the invention, a wavelength routing manager for a photonic WDM network operating according to a wavelength plan, comprises a plurality of static wavelength bins for grouping all wavelengths provided by the wavelength plan based on a wavelength natural performance parameter $\Delta Q$; and a wavelength selection rules WSR block with a plurality or wavelength selection rules, for organizing the static bins into dynamic bins according to the current topology and loading of the optical path and selects the wavelength according to the rules.

According to a still further aspect, the invention provides a method of organizing the wavelengths available in an automatically switched optical network operating according to a wavelength plan comprising: grouping all wavelengths provided by the wavelength plan into static bins according to a wavelength natural performance parameter $\Delta Q$; selecting from the static bins a set S0 of dynamic bins $B_{S0}$ based on a threshold value Th and the $\Delta Q$; and arranging the bins $B_{S0}$ into subsets based on a plurality of bin constraints designed for differentiating the subsets according to the extent of SRS transient reduction.

Furthermore, the present invention provides a method of selecting a wavelength for an optical path across an automatically switched optical network operating according to a wavelength plan, comprising: providing a plurality of configurable global variables, set according to the performance requirements of the network; grouping all wavelengths provided by the wavelength plan into static bins and, based on a plurality of bin constraints, organizing the static bins into subsets of dynamic bins S0, S1, S2 and S3 which include all wavelengths available for the optical path; and searching within the subsets for a wavelength (Lam) for the optical path that has an individual performance parameter $\Delta Q(\lambda)$ above a threshold and satisfies a maximum number of wavelength constraints, wherein the bin constraints and the wavelength constraints are designed for offering various degrees of SRS transient reduction.

Advantageously, provision of wavelength selection rules block enables addition of new rules to the existing ones, as well as rule changes. Furthermore, organizing the wavelengths into static wavelength bins allows manipulation of these bins as requested by a particular rule or set of rules. The bins may be organized based on a certain wavelength natural performance parameter (e.g. reach, or cost), fiber type and the wavelength plan (density, L-band or C-band). This enables the wavelength selection with various degrees of sophistication, and also adds flexibility to the process, in that it enables steering the selection for obtaining a desired mode of operation on the network. Still further, user-specific rules may be designed and used when/if required.

Use of wavelength bins and wavelength selection rules enables optimization of the wavelength selection process with minimal additional costs, since no new hardware is necessary. The particular optimization of the present invention biases the channel (wavelength) selection to increase operating margins with regard to Raman transient immunity.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION OF THE PREFERRED EMBODIMENTS

Figure 1:
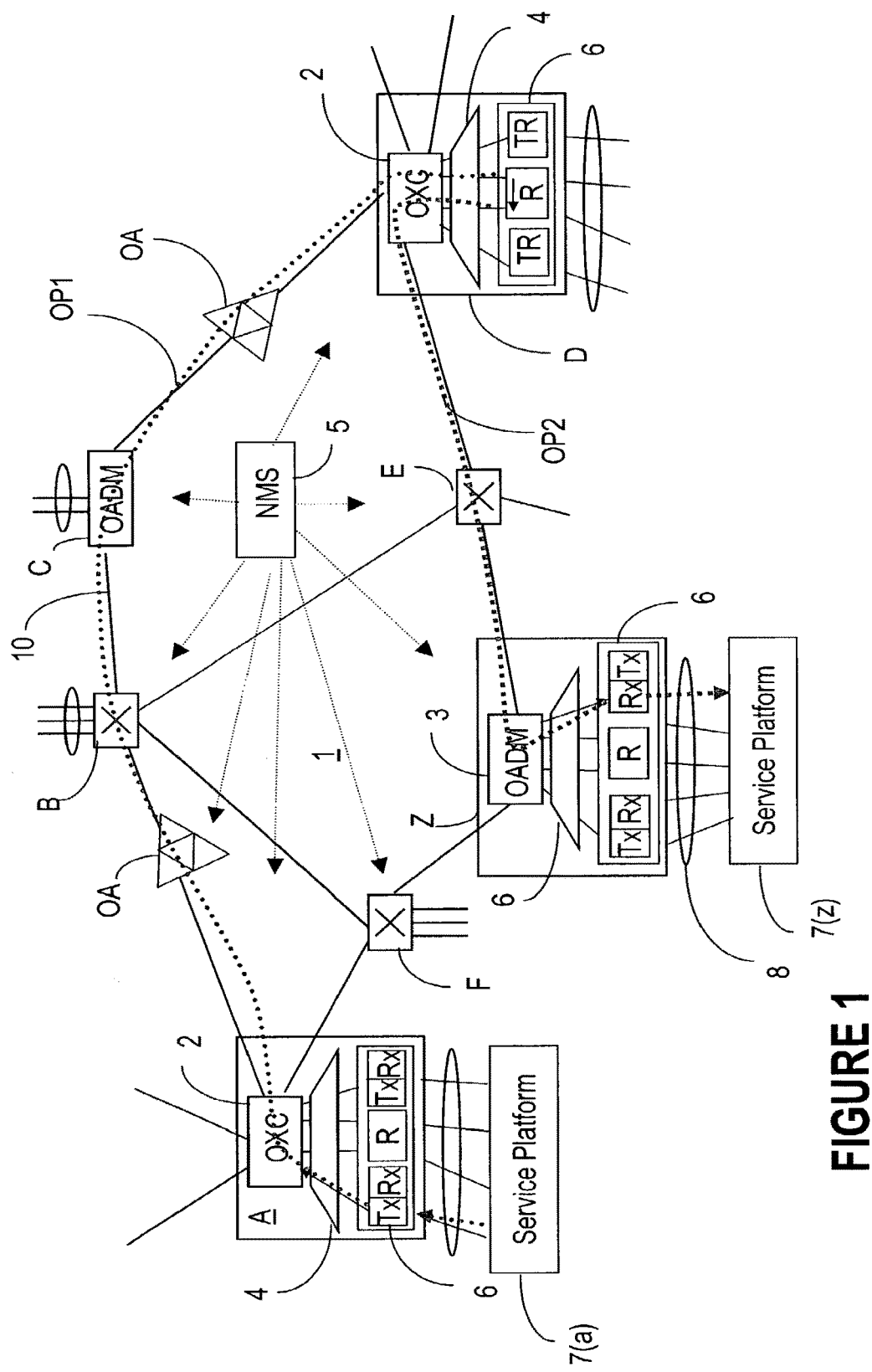
FIG. 1 shows an agile network and an exemplary A-Z connection with intermediate regeneration.

FIG. 1 shows an example of a photonic network 1 to which the present invention applies. As shown and described in the parent Patent Application Docket 1021 US, network 1 comprises bidirectional fiber links 10 connecting a plurality of flexibility sites, which are nodes A, B, C, D, E, F, Z in this example. The nodes could be switching nodes A, B, D, E, F, or OADM (optical add/drop multiplexing) nodes C, Z. User traffic 8, originating and terminating on a service platform 7 (e.g. a router, an ATM switch, an EXC, etc.), accesses network 1 at a switching node or an OADM node, also called a flexibility site.

A flexibility site or node of agile network 1 may be partitioned into the following building blocks:

a) Wavelength switches 2 and OADMs 3, which provide optical passthrough, (bypassing OEO conversions), and optical add/drop of the local traffic from/to the service platform 7.

b) An electro-optics interface 6, that performs on/off ramp of client signals onto/from the optical network. System 6 may include for each express fiber a pool of transponders (Tx-Rx pairs) that are the end points of any connection in network 1, and a pool of wavelength converters/regenerators R, that provide OEO-based wavelength conversion and/or regeneration in the network core.

c) Access multiplexing/demultiplexing and switching subsystem 4 that routes the add channels from a transmitter Tx of the electro-optics subsystem 6 along the converging branches of an add tree to the output side of the respective node. Subsystem 4 also routes the drop channels from the input of the respective switch 2 or OADM 3 along the diverging branches of a drop tree to a respective receiver Rx of the electro-optics sub-system 6. It also routes automatically individual channels between the line system and the regenerators for OEO conversion and signal processing.

FIG. 1 also shows a network management system MNS 5 that controls and manages operation of all network entities to achieve, among other functionality, automatic routing and switching of connections across network 1. In principle, NMS 5 selects the best route for a connection based on the knowledge of the current available network resources (wavelengths per link and regenerators and transponders per node) and on channel performance information.

A connection is a network connection that carries a user signal from a source node to a destination node along a certain end-to-end route (or trail). In the example of FIG. 1, A-Z connection travels along route ABCDEZ. As seen, other alternative routes are possible for this connection, such as ABEZ, or AFZ, or ABFZ.

A connection may be established along one optical path, or along a succession of optical paths if regeneration or wavelength conversion is necessary at intermediate nodes. In this example, connection A-Z originates at node A, where the user signal is modulated over a carrier channel. Connection A-Z passes through switching node B and OADM node C in optical format, and is OEO converted at node D where the user signal is processed in electrical format. For example, if the network management determines that the performance of the respective channel on the link C-D is unsatisfactory, it switches a regenerator R at node D to amplify, re-format and re-time the user signal. After this electronic processing, the user signal is re-launched towards node Z over the same wavelength or a different wavelength. The channel is dropped at node Z to a respective Rx, which extracts the user signal from the channel and directs it to service platform 7. Thus, in the example of FIG. 1, trail ABCDEZ has two optical paths, ABCD (OP1) and DEZ (OP2).

Figure 2:
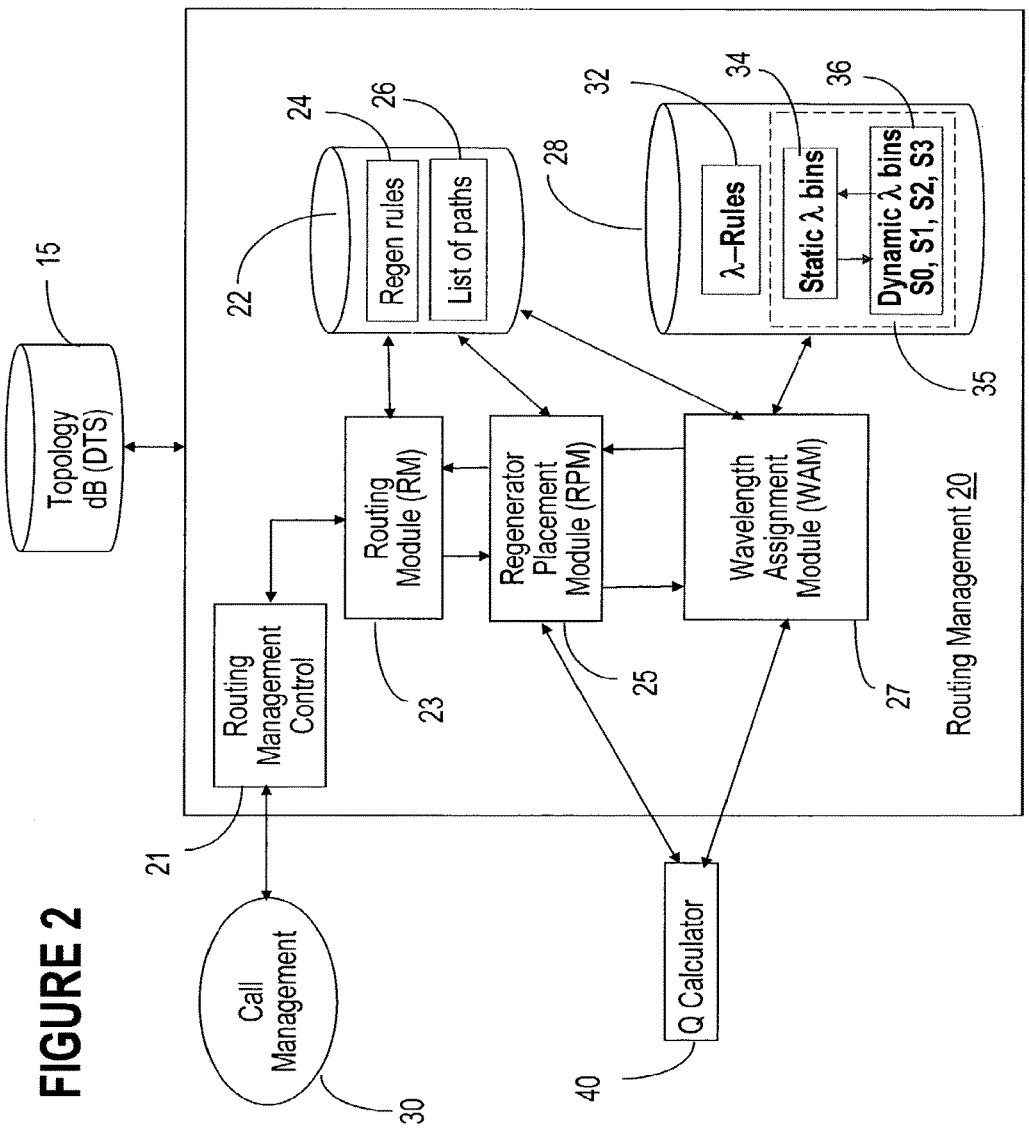
FIG. 2 illustrates the routing management system of the agile network shown in FIG. 1.

FIG. 2 illustrates a logical overview of the modules of the network management system 5, which are involved in wavelength routing and switching. This figure also shows the interaction between the modules, and is described in more details in the parent patent application Docket 1021 US. The following description provides general functionality of the most relevant blocks to this invention.

A call management block 30 provides a routing management platform 20 with a connection request. A request defines certain conditions and constraints, set according to the class of services applicable to the respective user.

Routing management platform RM 20 comprises a routing module RM 23, a regenerator placement module RPM 25, and a wavelength assignment module WAM 27, operating under supervision of a routing management control RMC 21. RMC 21 receives the call from block 30 and operates modules RM 23, RPM 27 and WAM 29 to generate a list 26 of possible best paths, which is kept in a database 22.

Routing module 23 is responsible for finding 'n' potential trails between source node A and destination node Z, based on the particulars of the call received with the connection request from call management 30.

Regenerator placement module 25 is responsible for determining 'm'0 sets of optical paths by tentatively placing regenerators at various nodes along each potential trail. RPM 25 orders these paths according to their chances of success and cost in list 26, and presents the paths from the list, one by one to the call management 30 for path set-up. If the first path on the list fails, the call management 31 requests the next path from the RMC 21 the next path, and so on, until a path is successful. This module operates based on regenerator placement constraints or rules shown generically at 24 in database 22.

The wavelength assignment module 27 is responsible with finding a single end-to-end wavelength, or a set of wavelengths for each trail (i.e. a wavelength for each optical path of the trail) based on wavelength constraints or rules 32 stored in a database 28. In addition, database 28 maintains wavelength performance information 35, as discussed in the above-identified patent application Docket 1046US. This information is organized in static wavelengths tables (bins) 34, pre-stored in database 28 during link commissioning, and dynamic wavelengths tables (bins) 36 that are constructed during wavelength assignment as seen later.

It is to be noted that databases 22 and 28 provide an intuitive representation of the type of information used by the routing management 20, the respective information being stored in the network MIB (management information base) and accessed using a distributed topology system 15. Distributed topology system DTS 15 provides unit 20 with an updated view of network topology and connectivity, to allow automatic and dynamic network resource allocation to connections.

A Q calculator 40 is available for use by the modules of the routing management 20. The Q calculator is a module provided on an optical engineering platform (not shown) for estimating the performance of a trail based upon knowledge of the topology and characteristics of the network. It encapsulates the physics of the propagation of signals through optical devices and tries to estimate the amount of distortion to a signal due to physical effects, such as cross-talk between wavelengths, to produce an estimate of the quality of the signal. In some instances, calculator 40 also provides a faster path quality estimate based on a limited numbers of trail parameters. The path performance (quality) parameter is denoted in the following with Q. In principle, the regenerator placement is based on regenerator availability, path cost and $\Delta Q$, and wavelength assignment is based on wavelength availability, wavelength reach and $\Delta Q$.

The invention proposes the following wavelength assignment rules 32, which take into account besides wavelength availability, the reach, path cost, SRS channel coupling, and wavelength fragmentation. In the examples provided throughout this specification, we assume that the network uses 100 channels, the lowest wavelength channel being $\lambda 1$ and the highest, $\lambda 100$.

Rule 1.

(Function F1) The first G channels (G is a configurable integer) added at any access subsystem are selected from a configurable range of channels given by a low limit F1_lowerLimit and a high limit F1_upperLimit. Preferably, the range is between $\lambda 11$-$\lambda 90$. If the only available wavelengths for the respective link are outside this range, the connection will use the most centred wavelength that remains and that satisfies the performance (reach) requirement of the optical path.

Rule 2.

(Functions F2, F3). A formula is proposed for wavelength selection at all access points along a trail. The value of this formula should not exceed a preset limit, unless all available wavelengths cause the limit to be violated. In this case, the connection will be set-up anyway with an attempt to minimize the magnitude of the violation.

$$|\Sigma \text{Sign}(\text{Center}-\lambda(n_i))\cdot(\text{Center}-\lambda(n_i))^{Power}|<Limit \quad \text{EQ1}$$

where:

$\lambda(n_i)$ is the range of the wavelength in the spectrum. For example, the value for $\lambda 87$ is 87.

Center is preferably set initially at 50.5, so that use of the equation EQ1 will tend to keep wavelength selection centered in the spectrum.

Power is a value that allows the user to change the weight of the channels in the spectrum. For example, a Power>1 forces a stronger bias of the wavelength selection towards the center of the spectrum.

The Sign(Center-$\lambda(n_i)$) is a function used to indicate that the direction of variance from the center wavelength is important in EQ1, irrespective on how it is formulated in the embedded algorithms embodying this rule. This is only relevant in the cases when Power is different from 1. For example, the term (Center-$\lambda(n_i)$)$^{Power}$ is always positive for Power=2 even if the difference (Center-$\lambda(\lambda n_i)$) is negative; the sign function will correct this accordingly.

Limit is preferably set initially at 200. In this way, if a short optical path is repetitively provisioned with the same A-Z demand, the wavelength selection sequence will minimize wavelength grouping as seen in the examples below.

Figure 3:
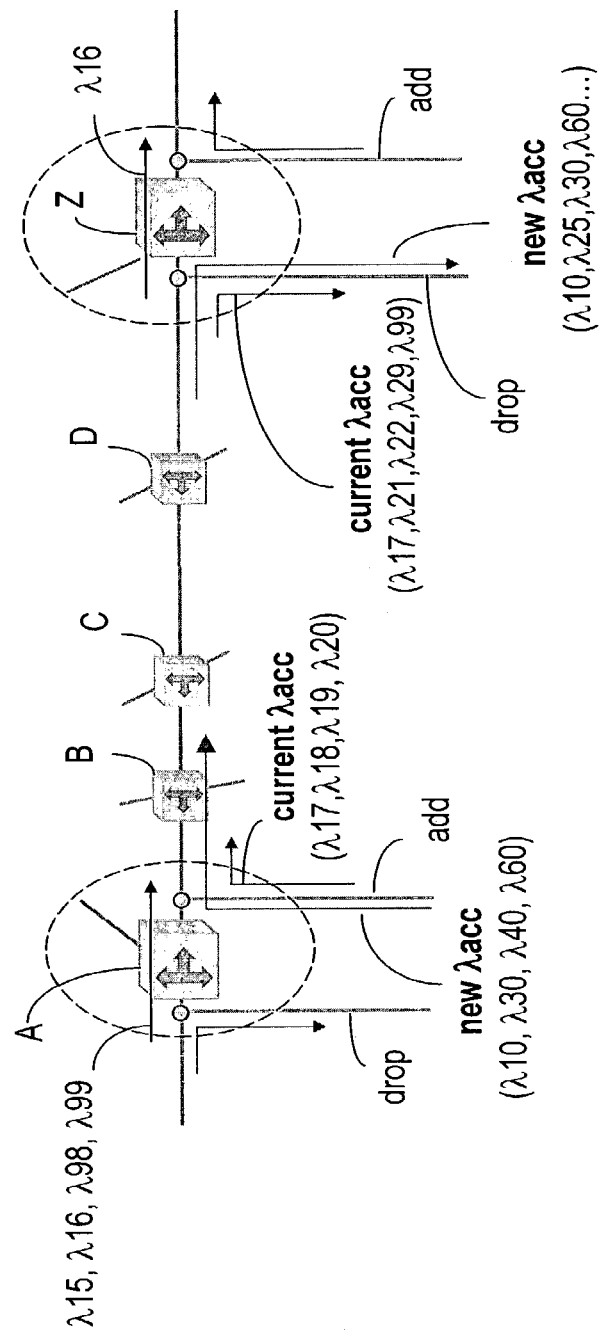
FIG. 3 shows an example of an optical path with access and tandem channels at the ingress and egress nodes.

FIG. 3 shows the route ABCDZ, which is generically designated as A-Z trail. In this example, node A is the ingress node, and node Z is the egress node; the add access is shown generically by the branch after node A and the drop access is shown by the branch before node Z. The term "access channels" is used for the channels added at node A towards node Z and the channels dropped at node Z. The term "tandem channels" is used for the channels passing through node A and node Z, respectively. Let's assume that currently there are four channels added at node A, namely $\lambda 17$, $\lambda 18$, $\lambda 19$ and $\lambda 20$, and six access channels dropped at node Z, namely $\lambda 17$, $\lambda 21$, $\lambda 22$, $\lambda 29$ and $\lambda 99$. Let's also assume that there are four tandem channels $\lambda 15$, $\lambda 16$, $\lambda 98$ and $\lambda 99$ at node A and a tandem channel $\lambda 16$ at node Z. To establish one or more additional A-Z connections, selection of the new access wavelength(s) according to the invention takes into account the position of the channels currently accessing the network at node A (here channels $\lambda 17$, $\lambda 18$, $\lambda 19$ and $\lambda 20$), so as to minimize SRS in the access tree at node A. Similarly, for destination node Z, the selection of the new wavelength, which may be different from those added at node A (due to eventual wavelengths conversions along trail A-Z), takes into account the position of the channels currently exiting the network at node Z (here channels $\lambda 17$, $\lambda 20$, $\lambda 22$, $\lambda 29$ and $\lambda 99$), so as to minimize SRS in the access tree at node Z.

In addition, selection of the new access wavelength(s) takes into account the position of all tandem channels at nodes A ($\lambda 15$, $\lambda 16$, $\lambda 98$ and $\lambda 99$) and Z ($\lambda 16$), in an attempt to reduce the transients at the ingress side of the node A (postamplifier) and at the egress side of the node Z (preamplifier).

Given that an optical path has two associated access points (add and drop), two separate calculations for EQ1 are necessary. The wavelength selection is determined by the value that is farthest from the center. For example, if the ingress value for EQ1 is −180 and the egress value is +50, the wavelength selection scheme would be geared towards the ingress side, without causing the egress value to exceed the Limit on the positive side. If no unique wavelength exists that will keep ingress/egress values of EQ1 below the Limit, then the wavelength that minimizes the sum of the absolute values of the ingress and egress functions should be chosen.

Rule 2 is applied in the following two scenarios:

2a) Access Function F2.

Let's assume that a plurality of successive calls (connection requests) specify the ingress node A and egress node Z of connection A-Z. Function F2 calculates EQ1 for ingress and egress wavelengths only, as discussed in connection with Table 1 and FIG. 3. We also assume in this example that EQ1 gives a farther from the center value for the ingress side than for the egress side of the optical paths and this is why the example only shows the calculations for the ingress access point A.

It is to be noted that on FIG. 3, the first four wavelengths are considered as already added at node A, since this drawing is also used later for explaining how the wavelength rules are applied for an A-Z connection. In the example described next, it is assumed that 8 new wavelengths are added consecutively at node A, with no pre-existing access or tandem wavelength.

F2 function calculates the sum for all ingress wavelengths as they are selected. When F2 exceeds the Limit, the respective wavelength is not selected and the wavelength search continues within a bin whose wavelengths will reduce F2.

In the first 4 wavelength selections, function F1 (first rule) is enforced so that only bins 2-9 are valid. Bin-2 has the lowest $\Delta Q$ value so that wavelengths $\lambda 17$, $\lambda 18$, $\lambda 19$ and $\lambda 20$ in Bin-2 that minimize F2 are chosen, assuming that wavelength fragmentation is equal and greatest for all wavelengths. $\Delta Q$ characterizes the bin performance and is determined by the Q-calculator 40 of FIG. 2.

On the 5$^{th}$ wavelength, Bin-1 can be used and again with all else being equal, wavelength $\lambda 10$ is chosen to minimize F2.

$\lambda 9$ would be the next choice, but the sum given by F2 would exceed the "Limit". Therefore, the bin with the lowest $\Delta Q$ and that contains a wavelength that would keep the function below the Limit is chosen. This is Bin-3 and $\lambda 30$ minimizes F2 with all else being equal.

On the next two calls, $\lambda 40$ in Bin-4 and then $\lambda 60$ in Bin-6 are chosen similarly

TABLE 1

| Order | Wavelength | Center-n | F2 |
|---|---|---|---|
| 1 | $\lambda 20$ | 30.5 | 30.5 |
| 2 | $\lambda 19$ | 31.5 | 62.0 |
| 3 | $\lambda 18$ | 32.5 | 94.5 |
| 4 | $\lambda 17$ | 33.5 | 128.0 |
| 5 | $\lambda 10$ | 40.5 | 168.5 |
| 6 | $\lambda 30$ | 20.5 | 189.0 |
| 7 | $\lambda 40$ | 10.5 | 199.5 |
| 8 | $\lambda 60$ | −9.5 | 190.0 |

While a Limit=200 was used in the above example, the Limit for F2 can take other values; to provide more flexibility to the wavelength selection rules Limit2 is made configurable.

2b) Access and Tandem Function F3

Let's assume again that a plurality of successive calls (connection requests) specify the ingress node A and egress node Z of optical path A-Z of FIG. 3. As above, there are 10 bins of 10 wavelengths each, for example $\lambda 1$-$\lambda 10$, . . . , $\lambda 91$-$\lambda 100$, the Limit2 (for F2) is equal to the Limit3 (for F3), and is assumed at 200, the Power is assumed 1 and the Center is assumed at 50.5. It is to be noted that the Limit3 may be different from Limit2. As before, we also assume that EQ1 gives a farther from the center value for the ingress side than for the egress side of the optical paths and this is why the example only shows the calculations for the ingress access point A. As shown in FIG. 3, there are some pre-existing tandem wavelengths at node A. Function F3 calculates EQ1 for all access wavelengths and all tandem wavelength at node A, as described next and shown in Table2. Again, when F3 exceeds the Limit3, the respective wavelength is not selected and the wavelength search continues with a bin whose wavelengths will reduce F3.

As before, according to the F1 function, the first access wavelengths must be in the range 11-90. In the example, $\lambda15$, $\lambda16$, $\lambda98$ and $\lambda99$ are tandem wavelengths, while $\lambda17$-$\lambda20$ are access wavelengths, as shown in Table 2. F2 and F3 functions are calculated as shown above starting with the wavelengths available in Bin-2. Both functions F2 and F3 must be less than the respective Limit2 and Limit3.

On the $7^{th}$ call setup attempt, the initial wavelength selection would be $\lambda10$. However, while this selection does not violate the access function F2, it would violate access and tandem function F3. To avoid this, a wavelength $\lambda50$ is chosen instead, which only adds 0.5 to these functions.

The next tandem wavelengths are $\lambda99$ and $\lambda98$ in Bin-10, which add negative terms to the F2 and F3.

On the $11^{th}$ call setup attempt, the initial wavelength selection would be $\lambda9$, having (Center-n)=40.5. As F2=169.0, this selection would increase F2 over the Limit, so it cannot be used, even if F3 would be less than 200. Instead, wavelength $\lambda30$ in Bin-3 is selected to minimize F2, F3.

TABLE 2

| Order | Wavelength | Type | Center-n | F2 | F3 |
|---|---|---|---|---|---|
| 1 | $\lambda16$ | tandem | 34.5 | 0.0 | 34.5 |
| 2 | $\lambda15$ | tandem | 35.5 | 0.0 | 70.0 |
| 3 | $\lambda20$ | access | 30.5 | 30.5 | 100.5 |
| 4 | $\lambda19$ | access | 31.5 | 62.0 | 132.0 |
| 5 | $\lambda18$ | access | 32.5 | 94.5 | 164.5 |
| 6 | $\lambda17$ | access | 33.5 | 128.0 | 198.0 |
| 7 | $\lambda50$ | access | 0.5 | 128.5 | 198.5 |
| 8 | $\lambda99$ | tandem | −48.5 | 128.5 | 150.0 |
| 9 | $\lambda98$ | tandem | −47.5 | 128.5 | 102.5 |
| 10 | $\lambda10$ | access | 40.5 | 169.0 | 143.0 |
| 11 | $\lambda30$ | access | 20.5 | 189.5 | 163.5 |

Rule 3.

If more than one wavelength in the candidate, bin has the same maximum fragmentation value, the wavelength that centers the F2/F3 function the most is to be selected.

Rule 4.

If all available wavelengths on an access link violate the access function F2, then the bin/wavelength that satisfies the quality requirement $\Delta Q$ and maximizes the improvement to the access function F2 should be selected. In other word, a failed connection attempt due to use of the Limit2 is not acceptable.

Rule 5.

If both the F2 and F3 functions exceed the respective Limit, priority goes to bringing F2 below the Limit2, followed by a best effort on lowering F3 below the Limit3. As in Rule 4, if all available wavelengths on an access link violate both F2 and F3, then the bin/wavelength that satisfies the quality requirement $\Delta Q$ and maximizes the improvement to the access function F2 should be selected.

Rule 6.

This rule prioritizes the wavelength selection criteria as follows:
1. $\Delta Q$ Wavelength performance (reach and cost) criteria
2. F1 Select the first four wavelengths from $\lambda11$-$\lambda90$
3. F2 Optimize wavelength selection in access
4. F3 Optimize wavelength selection across optical path
5. $\lambda$ Fragmentation Choose the most fragmented wavelength It is to be noted that the $\Delta Q$ constraint limits the candidate bins by biasing the wavelength selection process towards cost. Criteria 2-4 attempt to choose a wavelength within the least $\Delta Q$ bin that minimizes F1, F2, and F3 functions without violating any limits. If all bins violate some subset of F1, F2, F3, then F1 takes priority over F2, which takes priority over F3 in being kept within the limits. If it is not possible to find a wavelength that satisfies to F1, F2 and F3 functions, then the wavelength selection should minimize the magnitude of the violation based on the order of priorities listed above. For example if all of F1, F2, and F3 are violated, then the wavelength assignment chooses the wavelength that best minimizes the impact to F1 function. If F2 and F3 are violated, then the wavelength assignment chooses the wavelength that best minimizes the impact to F2 function. It is also to be noted that criterion 5 is in fact takes precedence over F1, F2 and F3, since these functions are applied taking into account the $\lambda$ fragmentation, to bias the selection towards the most fragmented wavelengths. It is advantageous to select wavelength from the most used wavelengths in the network, in order to minimize further the wavelength fragmentation. This results in better network economics, as less fragmentation means a lower number of regenerators needed for wavelength conversion. A lower wavelength fragmentation also reduces the call blocking.

Figure 4:
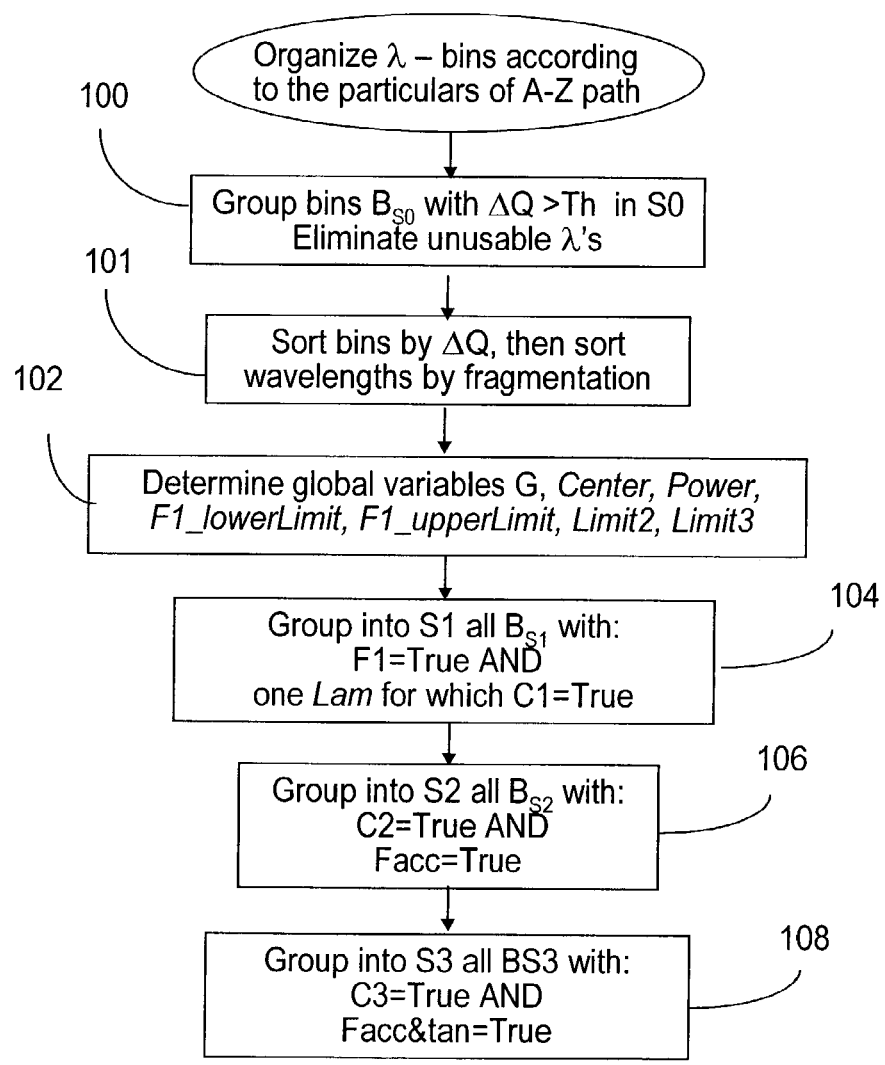
FIG. 4 is a flowchart showing how the wavelength bins are organized for assigning a wavelength to an A-Z optical path, taking into account transient reduction according to the invention.

FIG. 4 is a flowchart showing how the wavelength bins are organized for assigning a wavelength to an A-Z optical path, taking into account transient reduction according to the invention.

As discussed earlier, the wavelengths available across network 1 are organized in bins based on their performance; each bin 34 is characterized by a wavelength quality factor $\Delta Q$ reflecting the performance of the wavelengths it contains. For example $\Delta Q$ is calculated for a wavelength in the middle of the bin. For the same example as above (100 wavelengths, bins B1-B10, and 10 wavelengths/bin), B1 assumes the $\Delta Q$ of $\lambda5$, and B10 assumes the $\Delta Q$ of $\lambda95$. Once the A-Z fiber length and type are known, as well as the specification of the optical components along the path A-Z, the path loading, etc., Q-calculator 40 can provide $\Delta Q$ and WAM 27 can determine which bins to consider and which to disregard in order to reduce the searching time, based on the bin $\Delta Q$. It is to be noted that any other performance estimation/measurement may be used for qualifying the bins instead of $\Delta Q$ for the middle wavelength.

Step 100 of FIG. 4 shows that the bins $B_{S0}$ that have the performance parameter better than a certain threshold "Th" are grouped in a set S0 of bins. In the case when $\Delta Q$ is used as the bin performance parameter, S0 will include only the bins $B_{S0}$ with:

$$\Delta Q > \text{Thresh} \qquad \text{EQ2}$$

FIG. 2 shows this operation intuitively as "moving and grouping" the bins $B_{S0}$ into dynamic wavelength bins area 36. The term "dynamic" is used to indicate that the bins in area 36 and the wavelengths in these bins are manipulated by the WAM 27 and change in time as bins are moved and as the network connectivity changes. On the other hand, the bins in area 34 are "static" because they remain as they were organized at network commissioning time.

Step 100 also shows that the unusable channels (e.g. channels that are already used for other connections at nodes A and Z route) are removed from all bins $B_{S0}$. The bins are then ordered by $\Delta Q$ and the wavelengths in each bin $B_{S0}$ are ordered by fragmentation as shown by step 101.

The following global variables are defined as shown in step 102:

G is a configurable integer. F1 is applicable to the first G access wavelengths for an A-Z connection. For example, if G=4, F1 applies to the first four wavelengths accessing the network at node A/Z.

Power.

As defined above, this is a non-negative real value used for computing F2 and F3.

Center.

As defined above, this is a non-negative real value representing the center of the spectrum around which channels have to be balanced using F2 and F3.

F1_lowerLimit is the number of the lower available channel if less than G access channels are added on the optical path.

F1upperLimit is the number of the upper available channel if up to G access channels are added on the optical path.

Limit2: is a non-negative real value used for constraining F2.

Limit3: is a non-negative real value used for constraining F3. As discussed above, use of two different values for functions F2 and F3 allows increased flexibility; in the above examples in Table 1 and Table 2, Limit3 is equal to Limit2 and both are 200.

WAM 27 characterizes all bins by determining these parameters so as to enable an optimized wavelength selection according to the invention. In step 104, the bins of set S0, which contains all bins $B_{S0}$ with a viable wavelength that satisfies function F1 at both nodes A and Z of the path A-Z, are grouped into a subset S1. We denote the bins of this subset S1 with $B_{S1}$.

Bins $B_{S1}$ must have function F1=True, (i.e. must satisfy a first bin constraint) and also must have at least one wavelength that is between F1lowerLimit and F1upperLimit.

In order to determine the value of function F1 for the bins in S0, WAM 27 finds for each bin the channel with the shortest wavelength, denoted with Bmin and the channel with the longest wavelength Bmax.

The value of F1 is determined based on the information stored in area 34, as follows:

$F1\text{Diff}=\max\{(B\min-F1\text{upperLimit}), (F1\text{lowerLimit}-B\max)\}$ If $F1\text{Diff}$ is $>0$, $F1$ is set to False, If $F1\text{Diff}$ is $\leq 0$, $F1$ is set to True. (EQ3)

From all bins that satisfy first bin constraint F1=True, the bins that also contain a wavelength Lam between the lower and upper limits of F1, as given by a condition C1, are "moved" into subset S1. We denote the wavelength under consideration with Lam.

$F1\_\text{lowerLimit}<\text{Lam}<F1\_\text{upperLimit}$ (C1)

A subset S2 of bins $B_{S2}$ with at least a wavelength that satisfies function F2 is constructed next, as shown in step 106. This is translated in practice by "grouping" (or "moving") the bins $B_{S1}$ that satisfy a condition C2 (C2=True) and have the value for Facc=True, i.e. satisfy a second bin constraint, from S1 into S2 (S2 is thus a subset of S1).

To determine C2, WAM 27 first calculates for all bins $B_{S1}$ the minimum and maximum number of the channels that may be added at nodes A or Z as follows:

$F2A_{min}=\text{Current}F2A+\{\text{Sign}(\text{center}-B\min)\cdot|(\text{center}-B\min)|^{Power}\};$ $F2A_{max}=\text{Current}F2A+\{\text{sign}(\text{center}-B\max)\cdot|(\text{center}-B\max)|^{Power}\};$ $F2Z_{min}=\text{Current}F2Z+\{\text{sign}(\text{center}-B\min)\cdot|(\text{center}-B\min)|^{Power}\};$ $F2Z_{max}=\text{Current}F2Z+\{\text{sign}(\text{center}-B\max)\cdot|(\text{center}-B\max)|^{Power}\};$ (EQ4)

Condition C2 is applied as follows to each bin $B_{S1}$:

$\{[(-\text{Limit2}<F2A\max<\text{Limit2})\text{ OR}$
$(-\text{Limit2}<F2A\min<\text{Limit2})\text{ OR }(\text{sign}(F2A\min)$
$!=\text{sign}(F2A\max))]\text{ AND}$
$[(-\text{Limit2}<F2Z\max<\text{Limit2})\text{ OR}$
$(-\text{Limit2}<F2Z\min<\text{Limit2})\text{ OR }(\text{sign}(F2Z\min)$
$!=\text{sign}(F2Z\max))]\}$ (C2)

Next, Facc is calculated for the bins that satisfy C2, and for each wavelength Lam in these bins, to move into subset S2 only the bins with at least one wavelength that satisfies function F2. Facc depends on the wavelengths accessing currently the respective nodes (see FIG. 3), given by the CurrentF2.

$\text{Current}F2A/Z=\Sigma\{\text{sign}(\text{center}-i)\cdot|(\text{center}-i)|^{Power}\}$ (EQ5)

where i is the index for the current wavelength added at the access tree.

As discussed above, F2ALam is the value of function F2 for wavelength Lam at node A, and F2ZLam is the value of function F2 for wavelength Lam at end Z.

$F2A\text{Lam}=\text{Current}F2A+\{\text{Sign}(\text{center}-\text{Lam})|(\text{center}-\text{Lam})^{Power}|\};$ $F2Z\text{Lam}=\text{Current}F2Z+\{\text{sign}(\text{center}-\text{Lam})|(\text{center}-\text{Lam})^{Power}|\};$ (EQ6)

The second bin constraint is satisfied (Facc=True) if a wavelength Lam satisfies function F2 at both ends of the path, as shown below:

$[(-\text{Limit2}<F2A\text{Lam}<\text{Limit2})\text{ AND}$
$(-\text{Limit2}<F2Z\text{Lam}<\text{Limit2})]=\text{True}$ (EQ7)

A subset S3 of bins $B_{S3}$ with at least one wavelength that satisfies function F3 is constructed next, as shown in step 108. This is translated in practice by "grouping" (or "moving") the bins $B_{S2}$ that satisfy a condition C3 (C3=True) and a third bin constraint Facc&Tan=True, from S2 into S3 (S3 is thus a subset of S2).

To determine C3, WAM 27 first calculates for all bins $B_2$ the minimum and maximum number of the channels that may be added at nodes A or Z taking the tandem wavelengths in to account, as follows:

$F3A\min=\text{Current}F3A+\{\text{sign}(\text{center}-B\min)\cdot|(\text{center}-B\min)|^{Power}\};$ $F3A\max=\text{Current}F3A+\{\text{sign}(\text{center}-B\max)\cdot|(\text{center}-B\max)|^{Power}\};$ $F3Z\min=\text{Current}F3Z+\{\text{sign}(\text{center}-B\min)\cdot|(\text{center}-B\min)|^{Power}\};$ $F3Z\max=\text{Current}F3Z+\{\text{sign}(\text{center}-B\max)\cdot|(\text{center}-B\max)|^{Power}\};$ (EQ8)

Condition C3 is applied to each bin $B_{S2}$:

$$\{[(-Limit3<F3Amax<Limit3) \text{ OR} \\ (-Limit3<F3Amin<Limit3) \text{ OR } (sign(F3Amin) \\ !=sign(F3Amax))] \text{ AND} \\ [(-Limit3<F3Zmax<Limit3) \text{ OR} \\ (-Limit3<F3Zmin<Limit3)] \text{ OR } (sign(F3Zmin) \\ !=sign(F3Zmax))\} \quad (C3)$$

As discussed above, F3ALam is the value of function F3 for wavelength Lam at node A, and F3ZLam is the value of function F3 for wavelength Lam at end Z:

$$F3ALam = CurrentF3A + \{sign(center-Lam)|(center-Lam)^{Power}|\};$$

$$F3ZLam = CurrentF3Z + \{sign(center-Lam)|(center-Lam)^{Power}|\}; \quad EQ9$$

Facc&Tan constraint for the bin under consideration is satisfied (Facc&Tan=True) if a wavelength Lam satisfies F3 at both ends of the path, as shown below:

$$[(-Limit3<F3ALam<Limit3) \text{ AND} \\ (-Limit3<F3ZLam<Limit3)] = True \quad EQ10$$

Figure 5A:
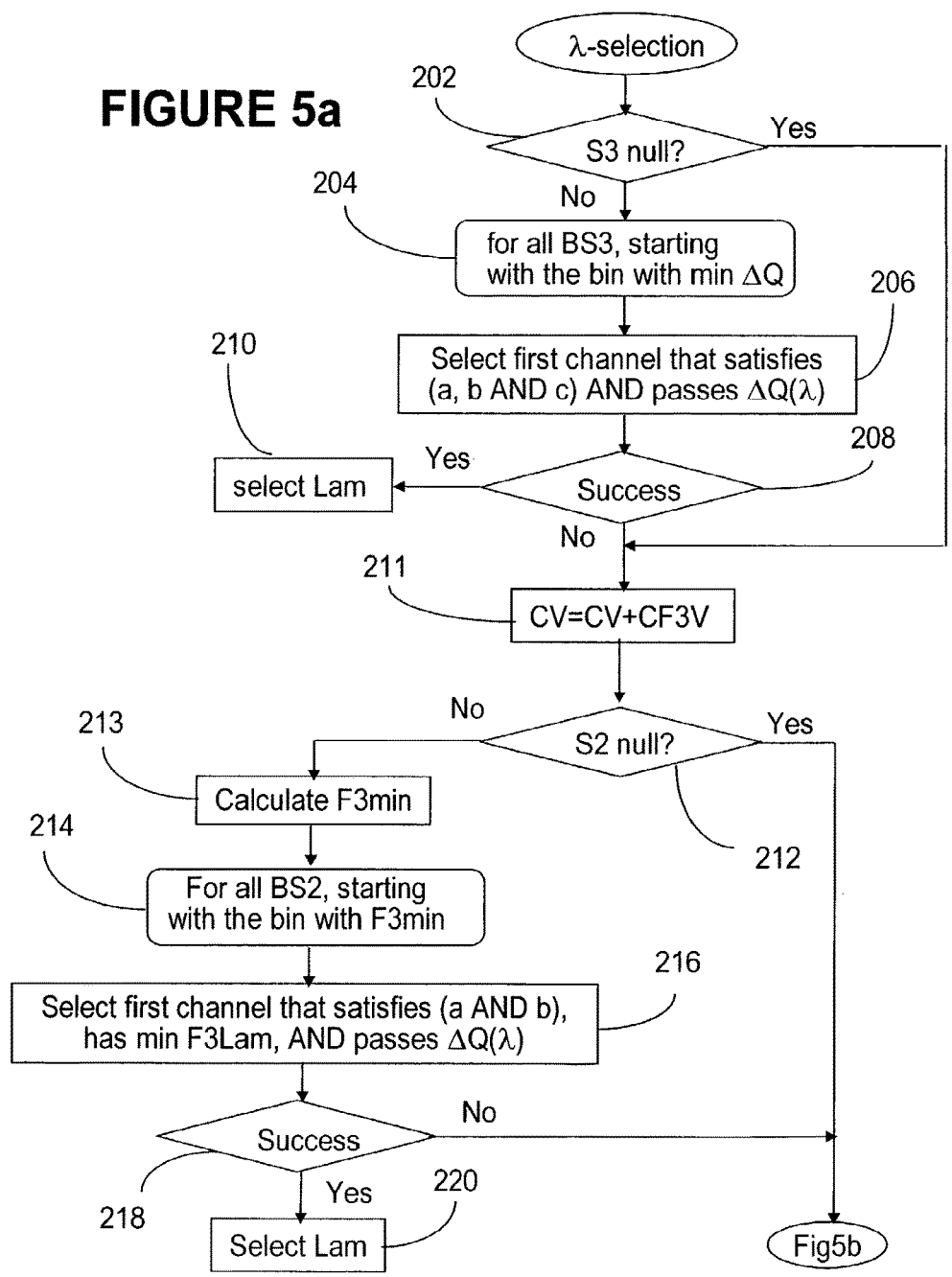
FIGS. 5a and 5b is a flowchart showing the steps for finding a wavelength that satisfies the wavelength assignment rules according to an embodiment of the invention.
Figure 5B:
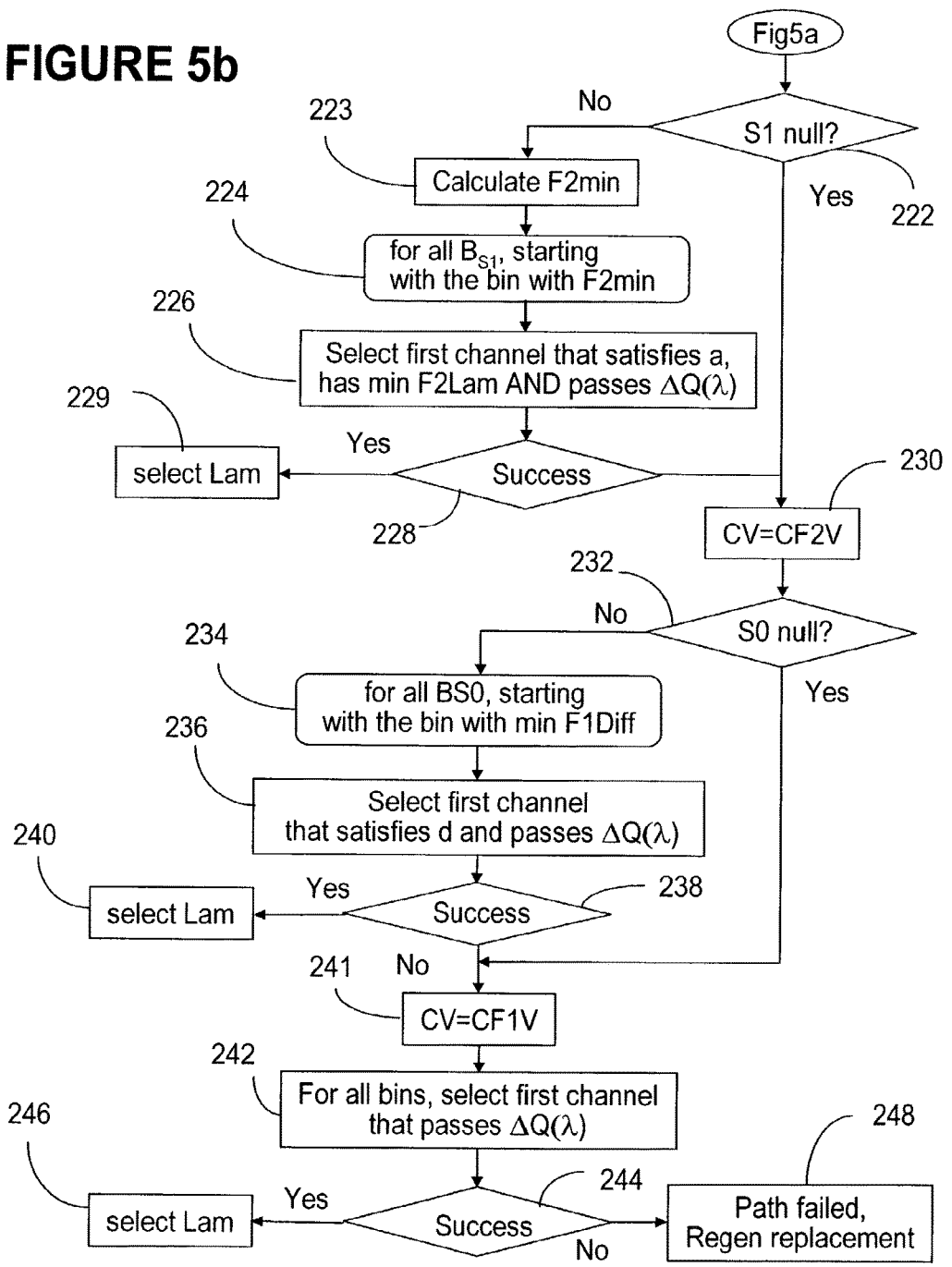

Once the bins are organized according to the particulars of the respective A-Z path, wavelength selection is performed as in FIGS. 5a and 5b, which illustrate the steps for finding a wavelength that satisfies rules 1-6 for wavelength selection with transient reduction.

The bins $B_{S3}$ of subset S3 are searched first; as seen above in connection with flowchart of FIG. 4, this subset includes the bins with wavelengths that satisfy all three functions F1, F2 and F3 ordered according to $\Delta Q$ and wavelength fragmentation. If there is no bin in subset S3, step 202, no wavelength satisfying all rules is available and the search continues in subset S2, for a wavelength satisfying a reduced number of rules. If S3 is not empty, for each bin in S3, starting with the bin with the least $\Delta Q$, and for each wavelength in the respective bin, WAM 27 finds the first wavelength which satisfies wavelength constraints (a), (b) and (c), as shown in step 204:

(a) $(F1Needed==False)$ (b) $[(-Limit2<F2ALam<Limit2) \text{ AND} \\ (-Limit2<F2ZLam<Limit2)]$ (c) $[(-Limit3<F3ALam<Limit3) \text{ AND} \\ (-Limit3<F3ZLam<Limit3)] \quad EQ11$ Fneeded is the value of function F1 determined for a wavelength Lam (channel under the consideration) and is True or False if the respective channel satisfies F1.

Once a wavelength that satisfies EQ11 (all three conditions (a), (b) and (c)) is found, the $\Delta Q(\lambda)$ for that Lam is estimated and compared with the threshold Th. This is because the performance $\Delta Q(\lambda)$ of some wavelengths in a bin with $\Delta Q>Th$ may be in fact worse than Th; $\Delta Q$ indicates the performance of a wavelength in the middle of the bin. To further speed-up the search, once a wavelength Lam fails the threshold test (i.e. $\Delta Q(\lambda)<Th$), all bins with the performance parameter $\Delta Q<\Delta Q(\lambda)$ are eliminated from the search.

The wavelength that satisfies EQ11 and also has an acceptable performance parameter $\Delta Q(\lambda)$ is selected for the respective A-Z path, as shown by branch Yes of decision block 208 and step 210.

If no wavelength satisfies EQ11, or the threshold check fails for all wavelengths that satisfy EQ11, then the search continues in the next bin $B_{S3}$, i.e. the bin in set S3 with the next higher $\Delta Q$, until all bins of S3 were checked, as shown by steps 204, 206 and 208. If still no wavelength is found over the entire S3, branch 'No' of decision block 208, the search continues in subset S2.

WAM 27 maintains a cost violation function for each direction, denoted with CV. This function is increased for each violation occurring at the respective end, namely whenever a wavelength that is nonetheless selected does not satisfy one of the rules. The CV will indicate how far from the ideal solution the respective wavelength is. The depth of the violation may also be pre-set to a specific value for each rule, according to the gravity of violation, in the order provided by Rule 6 above. CV is then used to differentiate the solutions if the regenerator placement has already been performed, in which case the routing module opts for the solution for the direction that has a lower CV. In this case, (branch No of decision block 208) since there is no wavelength that satisfies F3, CV is increased with a cost violation CF3V specified for failure of the selected wavelength to satisfy function F3. This is shown in step 211.

Next, the subset S2 is checked to find if it is empty, step 212. Since S3 is a subset of S2, all bins in S3 are also present in S2. If S2 is empty, there is no wavelength that satisfies function F2, and the wavelength selection will continue with step 220.

If S2 is not empty, WAM 27 calculates in step 213 the minimum values for functions F3 for all bins $B_{S2}$:

$$F3Min = min\{(|F3Amin|+|F3Zmin|), (|F3Amax|+|3Zmax|)\} \quad EQ12$$

The bins are ordered in S2 in increasing order of F3min, and all $B_{S2}$ are searched for a wavelength Lam that satisfies function F2, as shown by steps 214, 216 and 218. As shown by step 216, the search now uses only constraints a and b, starting with the bin with the lowest F3min. To reiterate, the wavelength constraints a and b are:

(a) $[(F1Needed==False)$ (b) $[(-Limit2<F2ALam<Limit2) \text{ AND} \\ (-Limit2<F2ZLam<Limit2)] \quad EQ13$ If after searching all bins $B_{S2}$ no wavelength satisfies EQ13, as shown by branch No of decision block 218, the search continues with step 220.

If multiple wavelengths satisfy EQ13, the wavelength with the lowest F3Lam is selected and the performance of the respective Lam is estimated for the threshold check. If the performance of this wavelength is acceptable, Lam is selected for the respective A-Z path, as shown by branch Yes of decision block 218 and step 219. If not, the next wavelength with the lowest F3Lam is selected, and the performance of this Lam is estimated for the threshold check, etc. until all wavelengths are checked.

The wavelength selection continues on FIG. 5b with the bins $B_{S1}$ of set S1. Now, the subset S1 is checked to find if it is empty, step 222. Since S2 is a subset of S1, all bins in S2 are also present in S1. If S1 is empty, there is no wavelength that satisfies function F1, and the wavelength selection will continue with step 2302.

If S1 is not empty, branch No of decision block 222, WAM 27 calculates the minimum values for functions F2 for all bins $B_{S1}$ in step 223, as follows:

$$F2Min: min\{(|F2Amin|+|F2Zmin|), (|F2Amax|+|F2Zmax|)\} \quad EQ14$$

The bins in S1 are ordered in increasing order of F2min, and all $B_{S1}$ are searched for a wavelength Lam that satisfies function F1, as shown by steps 224, 226 and 228. As shown by step 226, the search now uses only wavelength constraint a:

(a) [(F1Needed==False)]  EQ15

If after searching all bins $B_{S1}$ no wavelength satisfies EQ15 as shown by branch No of decision block 228, the search continues with step 230.

If multiple wavelengths satisfy EQ15, the wavelength with the lowest F2Lam is selected and the performance of the respective Lam is estimated for the threshold check. If the performance of this wavelength is acceptable, Lam is selected for the respective A-Z path, as shown by branch Yes of decision block 228 and step 229.

Now, the CV is increased with a preset cost violation value for violation of functions F2, denoted with CF2V, as shown in step 230.

Next, the set S0 is checked to find if it is empty, step 232. If S0 is empty, selection proceeds to step 241. If S0 is not empty, the bins in S0 are ordered in increasing order of F1diff, and the search begins with the bin BS0 with the minimum F1diff, steps 234, 236 and 238. F1diff is already present statically for each bin, as seen before (EQ3).

For each bin and each wavelength in a bin $B_{S0}$, the WAM 27 calculates in step 236 a wavelength constraint d:

(d) min{max[(Lam−F1_upperLimit), (F1_lowerLimit−Lam)]}  EQ16

This constraint provides a most centered wavelength available, even if it does not satisfy function F1. As before, the threshold check is performed on the wavelength that satisfies EQ16. As shown by decision block 238, if no wavelength can be found to satisfy constraint d and the threshold check, and with no more bins remaining. The CV is increased with a cost violation value preset for the violations of function F1, denoted with CF1V, step 241.

A wavelength that satisfies constraint d and the threshold check, as shown by the Yes branch of decision block 238, becomes a candidate for assignment to the respective call, as shown by step 240.

If there is no wavelength in set S0 that satisfies Functions F1-F3 and the best effort F1-F3, a wavelength that satisfies only Rule 4 (the threshold check) is selected for the A-Z path, as shown by steps 242, 244 and 246. However, a scenario with no available wavelength that satisfies only the threshold check is rather unlikely. If for some reason this still occurs, or if there are no contiguous wavelengths for path A-Z, as shown by branch No of decision block 244, and with no wavelength found and no bins remaining, the optical path A-Z can not be assigned a wavelength with a satisfactory $\Delta Q(\lambda)$. Hence, the WAM 27 processes the rest of the trail and then performs regenerator re-placement, step 248.

The run-time performance of wavelength selection described by the sequence of steps in FIGS. 5a and 5b can be further optimized as described next.

Again, set S0 is constructed as before from the optical path profile (length, fiber type, etc) to include all bins that has passed performance threshold. Now, the following operations may be performed instead of calculating complete subsets of S1, S2 and S3.

1. Order the bins in S0 in increasing order of $\Delta Q$
2. Pick the bin with least $\Delta Q$.
3. Find if this bin passes all conditions to fit in S1.
4. If it does, check if it fits in S2.
5. If it does fit in S2, check if it fits in S3.
6. If it does fit in S3, then perform the steps in FIG. 5.
7. If the bin fails to qualify for S1 or S2 or S3, then go to S0 and pick the next bin, with a higher $\Delta Q$ and perform all steps from 3 above.
8. Once a bin has qualified all checks for S3, if no wavelength can be found that satisfies the first set of constraints, then try next bin in S0 and perform all steps from 3.
9. If the bin has a wavelength which passes the first set of constraints, but fails the a $\Delta Q$ check, then eliminate all bins which have a $\Delta Q$ less than that of the bin with the failed wavelength. Then, select the next bin in S0 and perform the steps from 3.
10. If all bins in S0 have been checked and still no wavelength can be found which satisfies all constraints $\Delta Q$, F1, F2, F3, then perform the step 212 and start processing as specified there and further.

We claim:

1. In an automatically switched optical network operating according to a wavelength plan, a computer-implemented method of assigning wavelengths to an optical path for connecting two end nodes, comprising:
grouping all wavelengths provided by said wavelength plan into static wavelength bins according to wavelength physical effects characterized by a bin performance parameter $\Delta Q$, wherein said wavelength physical effects include SRS transients;
selecting from said static wavelength bins a set of dynamic wavelength bins based on a threshold and said $\Delta Q$; and
assigning a wavelength to an optical path based on said selection.

2. In a photonic WDM network operating according to a wavelength plan, a network management system (NMS) for engineering an optical path between two end nodes, comprising:
a plurality of static wavelength bins for grouping all wavelengths provided by said wavelength plan based on wavelength physical effects characterized by a bin performance parameter $\Delta Q$, wherein said wavelength physical effects include SRS transients; and
a wavelength assignment block with a plurality of wavelength selection rules, for organizing said static bins into dynamic bins according to the current topology and loading of said optical path and selecting said wavelength according to said rules.

3. A NMS as claimed in claim 2, wherein said block executes rules that limit selection of wavelengths for said optical path to a maximum of G wavelengths selected from a range of wavelengths centered about a center.

4. A NMS as claimed in claim 3, wherein said block executes rules that steer selection of said wavelength towards said center taking into account all wavelengths currently accessing said network at said end nodes.

5. A NMS as claimed in claim 4, wherein said rules steer selection of said wavelengths towards said center taking into account all wavelengths currently accessing said network at said end nodes and also taking into account all wavelengths currently passing through said end nodes.

* * * * *